United States Patent [19]

Cheung et al.

[11] Patent Number: 5,429,675
[45] Date of Patent: Jul. 4, 1995

[54] GRINDING AID COMPOSITION AND CEMENT PRODUCT

[75] Inventors: Josephine H. Cheung, Columbia; Ellis M. Gartner, Silver Spring, both of Md.

[73] Assignee: W. R. Grace & Co.-Conn., New York, N.Y.

[21] Appl. No.: 294,231

[22] Filed: Aug. 22, 1994

[51] Int. Cl.6 ............................................. C04B 24/02
[52] U.S. Cl. ............................... 106/802; 106/287.26; 106/814; 106/816; 106/823
[58] Field of Search .................. 106/287.26, 802, 814, 106/816, 823, 724

[56] References Cited

U.S. PATENT DOCUMENTS

| | | | |
|---|---|---|---|
| 2,710,812 | 6/1955 | Greider et al. | 106/287.26 |
| 3,615,785 | 10/1971 | Moorer et al. | 106/724 |
| 4,204,877 | 5/1980 | Moorer et al. | 106/724 |
| 4,491,480 | 1/1985 | Schenker et al. | 106/724 |
| 4,547,223 | 10/1985 | Goto et al. | 106/802 |
| 4,711,401 | 12/1987 | Serafin | 106/724 |
| 4,828,624 | 5/1989 | Valle | 106/724 |
| 5,020,598 | 6/1991 | Cowan et al. | 106/802 |
| 5,125,976 | 6/1992 | Skvara et al. | 106/724 |
| 5,348,583 | 9/1994 | Arfaei et al. | 106/823 |

*Primary Examiner*—Mark L. Bell
*Assistant Examiner*—Michael Marcheschi
*Attorney, Agent, or Firm*—Howard J. Troffkin

[57] ABSTRACT

A grinding aid composition suitable for grinding clinker into hydraulic cement powder, an improved grinding process and an improved cement product are disclosed. The grinding aid composition is composed of a mixture of at least one alkylene ether glycol and particulate carbon.

18 Claims, No Drawings

GRINDING AID COMPOSITION AND CEMENT PRODUCT

BACKGROUND OF THE INVENTION

The present invention is directed to a novel grinding aid for forming hydraulic cement powder from clinker raw material and to the method of forming an improved hydraulic cement product.

The term cement is used to designate many different kinds of agents useful to bind materials together. The present invention is directed to hydraulic cements useful to form structural elements, such as those of roads, bridges, buildings and the like. Hydraulic cements are powder material which, when mixed with water, alone or with aggregate, form rock-hard products, such as paste, mortar or concrete. Paste is formed by mixing water with a hydraulic cement. Mortar is formed by mixing a hydraulic cement with small aggregate (e.g. sand) and water. Concrete is formed by mixing a hydraulic cement with small aggregate, large aggregate (e.g. 0.2–1 inch stone) and water. For example, portland cement is a commonly used hydraulic cement material with particular standard specifications established in the various countries of the world (See "Cement Standards of the World", Cembureau, Paris, France). Further, various organizations, such as American Society for Testing and Materials (ASTM), American Association of State Highway and Transportation Officials, as well as other governmental agencies, have established certain minimum standards for hydraulic cements which are based on principal chemical composition requirements of the clinker used to form the cement powder and principal physical property requirements of the final cement mix.

Generally, hydraulic cements are prepared by sintering a mixture of components including calcium carbonate (as limestone), aluminum silicate (as clay or shale), silicon dioxide (as sand), and miscellaneous iron oxides. During the sintering process, chemical reactions take place wherein hardened nodules, commonly called clinkers, are formed. Portland cement clinker is formed by the reaction of calcium oxide with acidic components to give, primarily tricalcium silicate, dicalcium silicate, tricalcium aluminate, and a ferrite solid solution phase approximating tetracalcium aluminoferrite. The conventional cement chemists notation uses the following abbreviations: $CaO=C$; $SiO_2=S$; $Al_2O_3=A$ and $Fe_2O_3=F$. Thus, tricalcium silicate=$C_3S$; dicalcium silicate=$C_2S$; tricalcium aluminate=$C_3A$; and tetracalcium aluminoferrite=$C_4AF$.

After the clinker has cooled, it is then pulverized together with a small amount of gypsum (calcium sulfate) in a finish grinding mill to provide a fine, homogeneous powdery product. In certain instances other materials may be added or the clinker composition may be modified to provide a particular desired type of hydraulic cement. For example, in certain instances limestone, granulated blast furnace slag, pozzolans and the like are substituted for a portion of the expensive clinker material. These materials are generally inert and are used in cements where economy is of prime consideration and some diminution in strength is acceptable. The term "blended cement" refers to hydraulic cements having between 5 and 80% (more conventionally 5–60%) clinker substitute material as part of its composition. Other hydraulic cements include, for example, moderate heat portland cement, fly ash portland cement, portland blast furnace cement and the like.

Due to the extreme hardness of the clinkers, a large amount of energy is required to properly mill them into a suitable powder form. Energy requirements for finish grinding can vary from about 33 to 77 kWh/ton depending upon the nature of the clinker. Several materials such as glycols, alkanolamines, aromatic acetates, etc., have been shown to reduce the amount of energy required and thereby improve the efficiency of the grinding of the hard clinkers. These materials, commonly known as grinding aids, are processing additives which are introduced into the mill in small dosages and interground with the clinker to attain a uniform powdery mixture.

One of the major classes of grinding aids used today is the oligomers of lower alkylene glycols, such as diethylene glycol. They are used because of their availability and low cost. These glycols have had their grinding effectiveness enhanced by the inclusion of polyglycerols, lower fatty acids and sulfonated lignin (U.S. Pat. No. 4,204,877); unsaturated aliphatic acid and amines (FR 2,337,699); a $C_3$ aliphatic acid salt and an amine (U.S. Pat. No. 3,615,785); as well as alcohols and amides (U.S. Pat. No. 5,125,976).

Although the time required (and thereby energy consumed) is lessened when clinkers are ground in the presence of glycol grinding aids, the resultant powder cements do not exhibit any beneficial effect over cements formed without such grinding aid.

It would be desirable to be able to form a hydraulic cement powder product having enhanced properties, such as strength, by grinding in the presence of a grinding aid capable of causing an improved product.

SUMMARY OF THE INVENTION

The present invention is directed to an improved clinker grinding aid capable of forming a hydraulic cement product having enhanced early compressive strength properties. The present grinding aid is composed of a mixture of $C_2$–$C_3$ alkylene glycol and oligomers thereof in combination with carbon powder in weight ratios of from about 1:0.01 to 1:0.5.

DETAILED DESCRIPTION OF THE INVENTION

The present invention is directed to an improved grinding aid composition, a method of forming an improved hydraulic cement powder utilizing said grinding aid composition and to an improved cement powder product capable of exhibiting enhanced early compressive strength. The improved grinding aid composition is a mixture of a glycol and carbon, as fully described herein below.

The grinding aid composition of the present invention requires the utilization of at least one alkylene ether glycol and oligomers thereof, as represented by the formula: $HO(AO)_nH$, wherein A represents a $C_2$–$C_3$ alkylene, such as ethylene or propylene and n represents an integer of from 1 to 5. Examples of such compounds include ethylene glycol, diethylene glycol, triethylene glycol, propylene glycol, dipropylene glycol, tripropylene glycol and the like. These glycols can be used singly or as mixtures of two or more glycols.

The present grinding aid composition further requires the utilization of particulate carbon. The carbon should have an average particle size of from about 0.01 to 1 microns. The carbonaceous material can be either a mineral carbon, such as derived from coal or the like or carbon black particulate derived from thermal cracking or decomposition of hydrocarbon raw materials. For example, carbon black may be formed by an oil furnace process which consists of atomizing a heavy fraction of petroleum distillate into a preheated, closed furnace and then cooled and collecting the carbon aggregates formed. The preferred carbon particulates are those which have a morphology of a highly branched structure. These are known as high structure blacks.

The present grinding aid composition comprises a mixture of the above-described glycol and particulate carbon in a weight ratio of from 1:0.01 to 1:0.5, preferably from about 1:0.02 to 1:0.3. It has been found that one attains an improved cement having enhanced early strength properties when one has formed such cement with the aid of the present grinding aid.

Cements having high early strengths are highly desired in the construction industry. Structures formed with such cements are more readily worked at sooner periods of time and, thus, permit the total structure to be formed under a more accelerated schedule.

The subject grinding aid composition can have the ingredients separately introduced into the grinding mill. Preferably, they can be added as a dispersion of the carbon in glycol. A stable dispersion can be achieved by forming a mixture of the particulate carbon in the alkylene glycol and adjusting the pH of the mixture to at least about 8. The pH can be achieved by addition of an alkali metal oxide or hydroxide, ammonium hydroxide or by an organic base, such as an organic amine.

A preferred embodiment of the present invention is the grinding aid composition which is in the form of a stable dispersion of carbon in an alkylene glycol described above in which the pH of at least about 8 (preferably, at least about 9) has been achieved by the use of an organic amine selected from tertiary amines, such as alkylalkanol amines of the formula:

wherein each R is independently selected from a $C_1$–$C_5$ alkyl or $C_2$–$C_5$ (preferably $C_2$–$C_3$) hydroxyalkyl groups. Examples of such compounds include dimethyl ethanolamine, diethylethanolamine, triethanolamine, triisopropanolamine, diethanolpropanolamine, triethylamine, triisopropylamine and the like. The amine can be used as the free base or be introduced as a salt of a weak acid, such as acetic acid.

The base is used in sufficient amount to achieve the pH of at least about 8. The amine can be used in any amount to achieve the desired pH value. However, carbon and amine are normally used in weight ratio of from about 1:0.02 to 1:1.5. Thus, the amine is present in low amounts with respect to the cement.

The amount of grinding aid composition of the present invention used in a grinding process is from 0.01 to 0.06%, preferably from 0.01 to 0.03% of the clinker weight which is being ground.

The resultant cement is an improved product. The cement is a powder product of hydraulic cement having uniformly distributed therein from about 0.01 to 0.06% by weight, preferably from 0.01 to 0.03% of a mixture (1:0.01 to 1:0.5) of alkylene glycol and carbon particulate. A preferred hydraulic cement further contains an alkanolamine in amounts of up to about 1.5 times the carbon content.

The clinker is ground by conventional ball mill grinding with the present grinding aid composition. In continuous processes, the clinker can be pretreated, such as by spraying and the like, prior to entering the grinding zone. The resultant material is classified by particle size and the desired product is removed.

The following examples are given for illustrative purposes only and are not meant to be a limitation on the claims appendaged hereto. All parts and percentages are by weight unless otherwise indicated.

Examples

A series of grinding aid compositions were prepared for use in the tests described herein below by high shear mixing of the indicated glycol with a carboneous powder material, alone or with the addition of a tertiary amine to form a homogeneous mixture.

95 parts of a portland cement (Type I) clinker and 5 parts gypsum were ground in a Type I Abbe ball mill maintained at 100° C. and a speed of 54 rpm. After the clinker and gypsum grinding was commenced (100 revolutions), a grinding aid composition in combination with water to provide 0.4 parts additive was introduced into the clinker grinding chamber. The grinding was continued for 4000 revolutions to provide a powder cement product.

This process was repeated using the same clinker raw material to produce various cement products which have been treated with one of the series of grinding compositions produced above, as indicated in Table I below.

Mini-concrete samples were prepared from each of the formed cement products, using a distribution of sand particulate to simulate concrete aggregate. In this design, 639 parts of F95 sand, 532.5 parts of C109 sand, 213 parts of C185 sand, and 745.5 parts of 15S sand were introduced into an ELE Soiltest CT-345 mixer, according to ASTM C 305, and mixing was commenced. To this mix was introduced 710 parts of one of the cement products formed with a specific grinding aid composition. The solids were mixed for a short period and then 385.5 parts of water were added while mixing was continued at 140 rpm for 8 minutes. Two inch mortar cubes were cast from the mix according to ASTM C-109. Compressive strengths were determined at 2 and 7 days from casting. The results are shown in Table I below.

TABLE I

| Additive** | Dosage % | Compressive Strength PSI | |
|---|---|---|---|
| | | @ 2 days | @ 7 days |
| None* | — | 3388 | 5319 |
| DEG* | 0.02 | 3265 | 6043 |
| DEG/TEA* | 0.02/0.001 | 3119 | 6242 |
| DEG/CB | 0.02/0.002 | 3420 | 6272 |
| DEG/MB | 0.02/0.002 | 4129 | 6516 |
| DEG/CB/TEA | 0.02/0.005/0.001 | 3416 | 6266 |
| DEG/CB/TIPA | 0.02/0.002/0.002 | 3474 | 6668 |
| DEG/CB/TIPA | 0.02.0.002/0.0005 | 3482 | 6886 |

*Comparative Samples
**DEG = Diethylene glycol
TEA = Triethanolamine
TIPA = Triisopropanolamine
CB = Carbon black
MB = Mineral black

What is claimed:

1. A grinding aid composition for cement clinker grinding comprising a mixture of at least one alkylene glycol represented by the formula:

$$HO(AO)_nH$$

wherein A represents a $C_2$–$C_3$ alkylene and n is an integer from 1 to 5 and particulate carbon in a weight ratio of alkylene glycol to carbon of 1:0.01 to 1:0.5.

2. The composition of claim 1 wherein the carbon has a particle size of from 0.01 to 1 micron.

3. The composition of claim 1 wherein the alkylene glycol is selected from the group consisting of diethylene glycol, triethylene glycol, monopropylene glycol, dipropylene glycol, tripropylene glycol and mixtures thereof.

4. The composition of claim 2 wherein the alkylene glycol is selected from the group consisting of diethylene glycol, triethylene glycol, monopropylene glycol, dipropylene glycol, tripropylene glycol and mixtures thereof.

5. The composition of claim 1 wherein the composition has a pH of at least 9.

6. The composition of claim 4 wherein the composition has a pH of at least 9.

7. The composition of claim 5 wherein the pH is attained by the addition of a base selected from an alkali metal oxide, alkali metal hydroxide, ammonium hydroxide, or an organic amine.

8. The composition of claim 7 wherein the base is an organic amine selected from an alkanolamine having at least one $C_2$–$C_3$ hydroxyalkyl group.

9. A hydraulic cement composition comprising a mixture of hydraulic cement powder having uniformly distributed therein from 0.01 to 0.06% by weight of a mixture of alkylene glycol represented by the formula:

$$HO(AO)_nH$$

wherein A is selected from a $C_2$–$C_3$ alkylene and n is an integer of 1 to 5 and particulate carbon; the glycol to carbon weight ratio being from 1:0.01 to 1:0.5.

10. The composition of claim 9 wherein the carbon has a particle size of from 0.01 to 1 micron.

11. The composition of claim 9 wherein the alkylene glycol is selected from the group consisting of diethylene glycol, triethylene glycol, monopropylene glycol, dipropylene glycol, tripropylene glycol and mixtures thereof.

12. The composition of claim 9 which further contains an alkanolamine having at least one $C_2$–$C_3$ hydroxyalkyl group.

13. A process to form hydraulic cement comprising treating cement clinker with from 0.01 to 0.06% by weight based on the clinker weight of a grinding aid composition composed of at least one alkylene glycol having the formula:

$$HO(AO)_nH$$

wherein A is ethylene or propylene and n is an integer of 1–5, and particulate carbon having a particle size of from 0.01 to 1 micron; said glycol to carbon weight ratio is from 1:0.01 to 1:0.5; subjecting the treated clinker to a grinding medium for a period sufficient to form a powder product; classifying the resultant powder product; and removing the desired cement powder.

14. The process of claim 13 wherein the alkylene glycol is selected from diethylene glycol, triethylene glycol, monopropylene glycol, dipropylene glycol, tripropylene glycol and mixtures thereof.

15. The process of claim 13 wherein the carbon has a particle size of from 0.01 to 1 micron.

16. The process of claim 14 wherein the grinding aid composition is a dispersion of carbon in at least one alkylene glycol, said dispersion having a pH of at least 9.

17. The process of claim 16 wherein the grinding aid composition further comprises an alkanolamine.

18. The process of claim 17 wherein the alkanolamine has at least one $C_2$–$C_3$ hydroxyalkyl group.

* * * * *